United States Patent [19]

Dunn et al.

[11] 4,400,815

[45] Aug. 23, 1983

[54] ELECTRODE ALIGNING APPARATUS

[75] Inventors: Charles S. Dunn, Pataskala; Stephen Seng, Bladensburg, both of Ohio

[73] Assignee: Owens-Corning Fiberglas Corporation, Toledo, Ohio

[21] Appl. No.: 342,854

[22] Filed: Jan. 26, 1982

[51] Int. Cl.³ .............................................. H05B 7/14
[52] U.S. Cl. ........................................ 373/92; 212/210
[58] Field of Search ................................. 373/51-53, 373/91, 92, 88, 166; 212/209, 210, 214; 414/561

[56] References Cited

U.S. PATENT DOCUMENTS

| 2,000,221 | 5/1935 | Dawson . | |
|---|---|---|---|
| 2,343,443 | 3/1944 | Brooke | 373/92 |
| 2,737,596 | 3/1956 | Haupt et al. | 212/209 |
| 3,297,170 | 1/1967 | McCready et al. | 212/210 |
| 3,937,867 | 2/1976 | Wynne . | |
| 4,121,955 | 10/1978 | Jaunich et al. | 373/92 |
| 4,154,973 | 5/1979 | Paton et al. . | |
| 4,185,158 | 1/1980 | Koga et al. . | |

FOREIGN PATENT DOCUMENTS 489475  1/1930  Fed. Rep. of Germany ........ 373/92

Primary Examiner—Roy N. Envall, Jr.
Attorney, Agent, or Firm—Ronald C. Hudgens; Patrick P. Pacella

[57] ABSTRACT

An apparatus for accurately aligning a replacement electrode with a working electrode. The replacement electrode is suspended from a trolley movable in two directions in a rectilinear pattern. The trolley is moved initially in a first direction into general transverse alignment with the working electrode position, then displaced in a second direction against a fixed stop to overlie the desired electrode position. The trolley is adjusted finally in the first direction during its travel toward the fixed stop by contacting a mast on the trolley with a fixed guide adjacent the stop.

9 Claims, 4 Drawing Figures

ELECTRODE ALIGNING APPARATUS

TECHNICAL FIELD

In the operation of arc furnaces, melters or smelters utilizing consumable electrodes, the electrodes generally are made of pre-baked carbon and are manufactured in discrete lengths which are spliced together by internal threads or by threaded nipples inserted into threaded recesses formed in the axial extremities of the cylindrical electrodes. As a working electrode is consumed, the next successive new replenishment or replacement electrode is threaded to the working electrode in axial alignment therewith. Preferably, the electrodes are oriented so that the lower, presently installed, working electrode has a threaded, internal recess at its upper end, and the replenishment electrode is provided at its lower end with male threads adapted to matingly engage the threads of the lower electrode recess.

To perform the replacement function, the replacement electrode is suspended from an overhead support and is simultaneously lowered and rotated relative to the fixed working electrode until the two electrodes are firmly threaded together. It is necessary that the two electrode sections be precisely aligned axially so that accurate threading can be carried out.

Where the furnace has a plurality of vertical electrodes which are spaced laterally and transversely from one another, e.g., in a triangular configuration when viewed in plan, the prior art offers no solution to the problem of accurately aligning a replacement electrode with a selected working electrode. The prior art has proposed various forms of swinging arms or vertical support posts from which the electrode lowering and rotating mechanism is supported. Where the furnace has a plurality of vertical electrodes, the prior art swinging arm or vertical post arrangement requires a plurality of replicated structures which are both expensive and space-consuming.

The prior art has also proposed various travelling crane arrangements, but these prior art constructions, as suggested in U.S. Pat. No. 4,185,158, require massive support structures and require extremely accurate manual positioning to carry out the replacement function. Even where the use of a trolley has been proposed in the prior art, as in German Pat. No. 489,475, the same precise manual location of the electrode and its installation means is required.

Consequently, there is a need in the art for a single positioning and aligning mechanism capable of servicing a plurality of spaced electrode locations and capable of locating a replacement electrode in precise axial alignment with a selected one of several working electrodes.

DISCLOSURE OF INVENTION

The present invention now provides a new and novel electrode aligning apparatus and method for use in electric arc furnaces, melters and smelters provided with vertical electrodes spaced laterally and transversely.

Generally, the present invention proposes the utilization of a trolley which is movable in two directions in a rectilinear pattern above the location of the electrodes. A replacement electrode is carried by a supporting and rotating mechanism depending from the trolley and vertically alignable by means of the trolley with the vertical axis of the working electrodes.

The trolley frame is supported for movement in a first longitudinal direction on a pair of fixed, parallel guide elements until the trolley is generally transversely aligned with the desired working electrode location. The trolley is then displaced relative to the trolley frame in a transverse direction toward the desired working electrode. As the trolley is moved into position, it contacts a fixed guide which is aligned with the desired working electrode location. The trolley-guide contact adjusts the trolley frame longitudinally into precise alignment with the desired working electrode. Finally, the trolley contacts a fixed stop to halt the transverse trolley movement with the replacement electrode in precise vertical axial alignment with the working electrode.

By utilizing individual guides for the separate working electrode locations and providing each guide with a specifically located stop, it is possible to translate the rectilinear movement of the trolley frame and trolley, respectively, into a precise location individual to the selected working electrode position no matter what the geometric arrangement of the electrodes may be and no matter how many working electrodes need be serviced by the single trolley mechanism.

DETAILED DESCRIPTION OF THE PREFERRED EMBODIMENT

Figure 1:
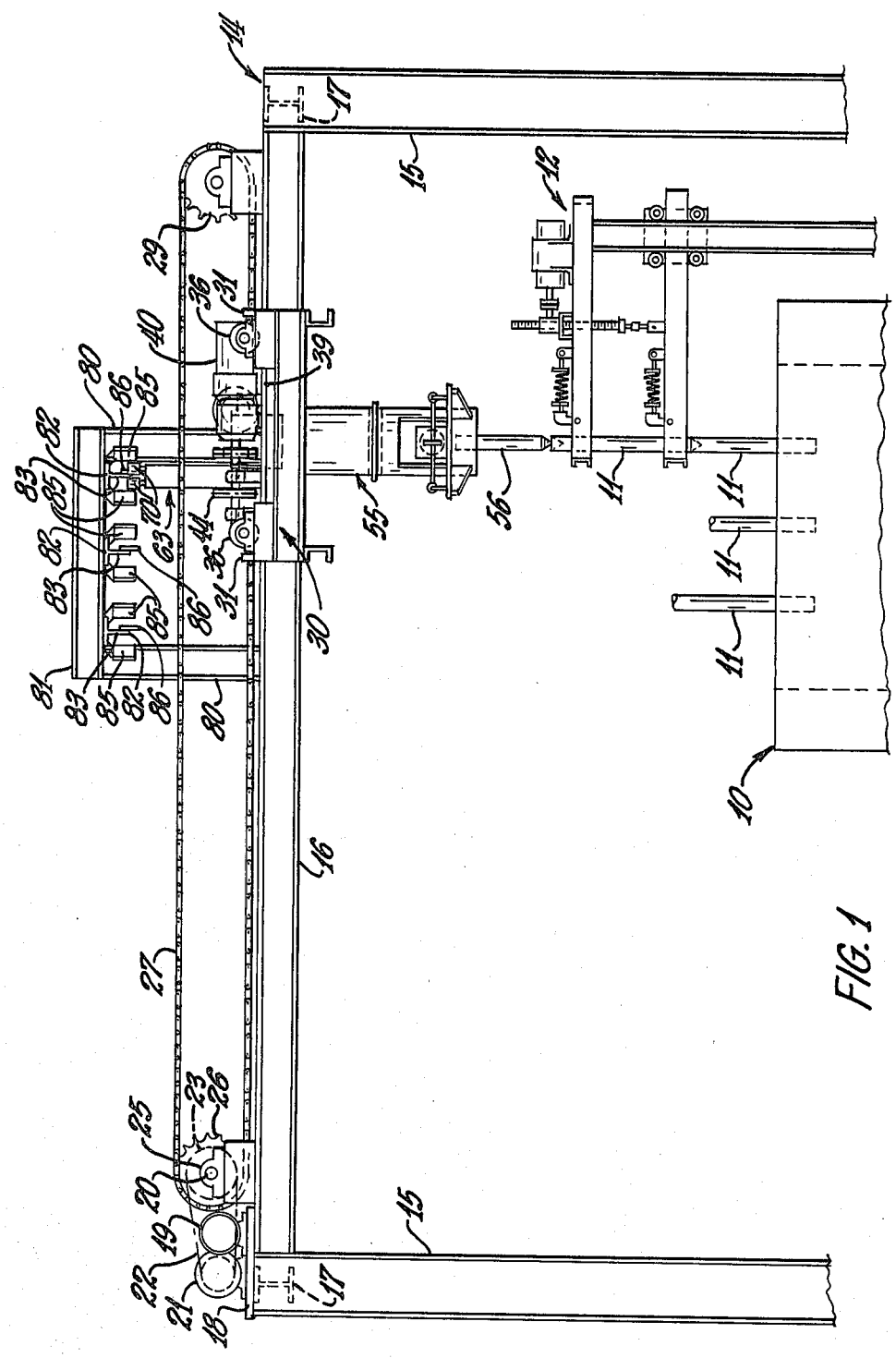
FIG. 1 is a side elevation view of an arc furnace provided with a plurality of vertical working electrodes and a replacement electrode is illustrated as it is installed by the electrode aligning apparatus of the present invention.
Figure 2:
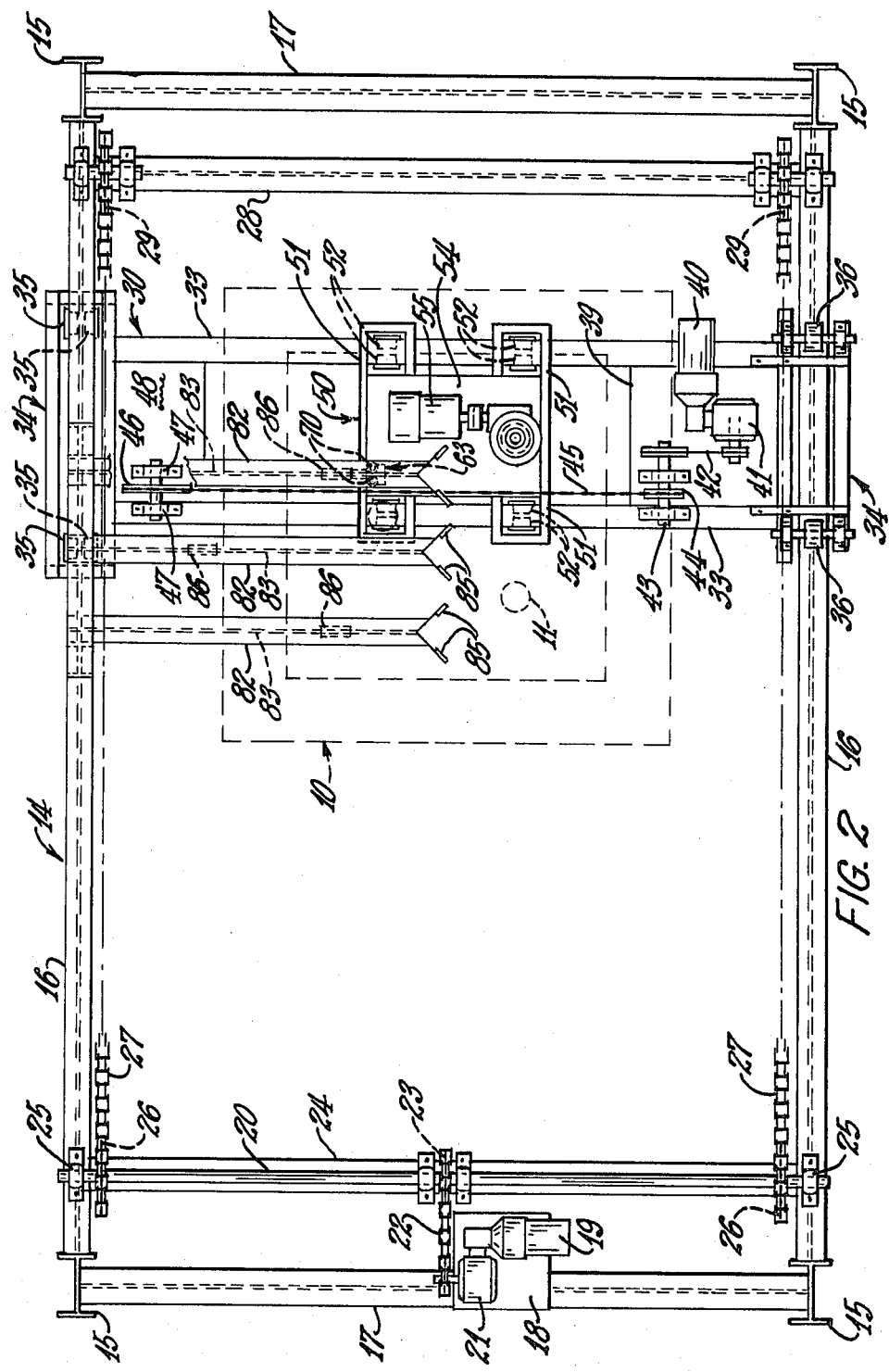
FIG. 2 is a plan view of the apparatus illustrated in FIG. 1.

As best shown in FIGS. 1 and 2 of the drawings, the electrode replacement mechanism of the present invention is intended to be utilized with an electric arc melter 10 having a plurality of vertical, consumable electrodes 11 which require periodic replacement.

Preferably, the electrodes 11 are of compressed carbon and are provided with threaded terminal ends, so that the threaded lower end of a replacement electrode can be threaded onto the threaded upper end of an installed electrode. The structure of the electrodes, the manner in which they are supported, and the specific manner in which the threaded electrodes are replenished or replaced is specifically set out in co-pending applications, filed on even date herewith and assigned to the assignee of the present invention. In FIG. 1, a typical electrode support and movement assembly is indicated by reference numeral 12. Each of the installed electrodes 11 is generally referred to as a "working electrode."

According to the present invention, a rectilinear support frame 14 is provided in surrounding and overlying relation to the furnace 10. More specifically, the rectilinear frame 14 includes vertical corner support posts 15 joined by longitudinal guide rails 16 and transverse support elements 17. As shown, the elements 15, 16 and 17 are all relatively massive I-beams and are secured together by suitable means to form the frame 14. A support platform 18 located medially of one of the transverse members 17 supports a drive motor 19 which drives a transverse shaft 20 through an angle drive 21, drive chain 22 and a sprocket 23 supported on suitable bearings mounted on a transverse beam 24. The drive shaft 20 is suitably journalled in bearings 25 mounted on the longitudinal frame guide members 16 and sprockets 26 are mounted adjacent the remote ends of the shaft 20 to drive chains 27 trained thereabout. A support beam 28 adjacent the remote end of the guide beams 16 supports suitably journalled sprockets 29 about which the chains 27 are trained.

A trolley frame indicated generally at 30 is secured to the ends of each of the chain 27, as at 31. As the chains 27 are driven by the motor 19, the angle drive 21, the chain 22, the sprocket 23 and the shaft 20 bearing the sprockets 26, the trolley frame 30 is advanced longitudinally along the longitudinal guide beams 16. The trolley frame 30 includes a pair of transverse I-beams 33 having their ends joined by rectangular frames 34. One of the rectangular frames 34 supports rollers 35 interposed between and engaging the flanges of the one support beam 16, and the other frame 34 carries cylindrical rollers 36 which engage the upper surface of the other guide beam 16. Thus, the chains 27 move the trolley frame 30 longitudinally along the guide beams 16, the trolley frame being supported on the beams 16 by the rollers 35, 36.

Mounted on the trolley frame 30 and spanning the transverse beams 33 is a fixed platform 39 upon which is mounted a drive motor 40 and an angle drive unit 41 having its drive chain rotating a drive shaft 43 upon which is mounted a sprocket 44. A trolley drive chain 45 laps the sprocket 44 and a second sprocket 46 supported by bearings 47 mounted on a second fixed platform 48 spanning the beams 33.

A trolley indicated generally at 50 is mounted on the I-beams 33 for movement therealong. This trolley 50 comprises a central platform 54 overlying the guide elements 33 and having lateral extensions 51 carrying supporting rollers 52 interposed between and engaging the vertically spaced flanges of the I-beams 33 which serve to guide the trolley 50 for transverse movement.

The platform 51 serves to carry the supporting and rotating means, indicated generally at 55, for a replacement electrode. This supporting and rotating means 55 is specifically disclosed and claimed in co-pending application Ser. No. 342,672, filed on even date herewith, and forms no part of the present invention. However, it will be noted that the structure 55 carries a replacement electrode 56 located well beneath and depending from the platform 51 for attachment to one of the working electrodes 11.

The trolley 50 is connected to the chain 45, so that the trolley is moved along the length of the guide elements 33 as the motor 40 is actuated, the direction of movement of the trolley 50 being transverse to the direction of movement of the trolley frame 30. Thus, the motor 19 and the motor 40, in combination, drive the trolley 50 in two rectilinear directions relative to the furnace 10.

Figure 4:
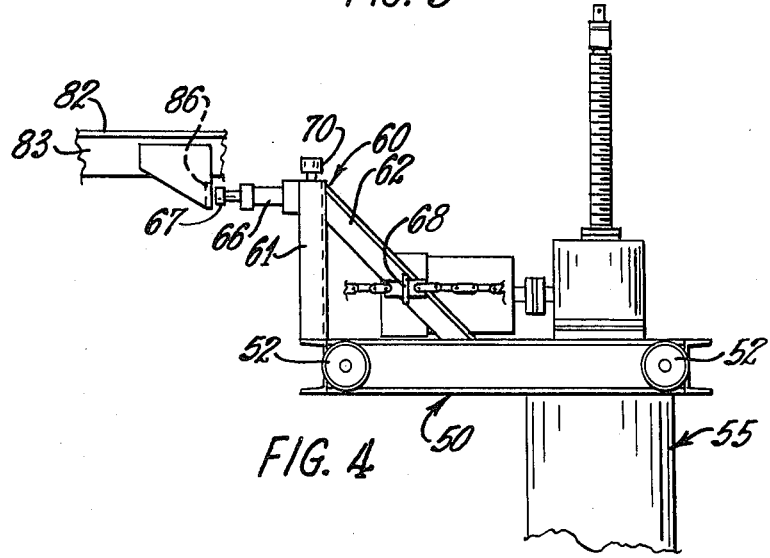
FIG. 4 is an enlarged side elevational view of the trolley, the guide mechanism, and the stop of the illustrated apparatus.

More specifically, the trolley platform 54 carries an upstanding mast indicated generally at 60 and including a vertical arm 61 fixed to the platform to project upwardly therefrom and a downwardly inclined brace arm 62 connecting the upper end of the arm 61 to the platform 51, as best seen in FIG. 4. The upper end of the arm 61 carries a shock absorber 66 terminating in a contact pad 67 projecting beyond the shock absorber 66. The post 63 is surmounted by a pair of transversely spaced rollers 70 for a purpose to be hereafter more fully described.

The ends of the chain 55 are attached to the brace arm 62 as at 68.

Mounted on one of the guide rails 16 is a pair of upstanding posts 80 joined by a top member 81 parallel to the guide rail 16, a shown in FIG. 1. Secured to the undersurface of the top member 81 is a plurality of "T"-shaped guide elements 82, each such guide element 82 having a depending, planar, vertical guide surface 83. The guide surfaces of the elements 82 are spaced along the length of the guide beams 16 at the spacing of the three electrodes 11, but in offset relation thereto. Each guide element 82 terminates at its remote, cantilevered end in a pair of angularly related, divergent depending guide pads 85 which are spaced apart a sufficient distance to receive therebetween the rollers 70 located on the mast 63. The guide pads 85 are inclined inwardly toward the central guide surfaces 83 of the elements 82 and serve to deflect the rollers 70 centrally toward the depending guide surfaces 83 of the elements 82.

Positioned along the length of each of the guide surfaces 83 of the elements 82 is a fixed stop 86. These stops 86 are positioned to abut the shock absorber pad 67 when the trolley 50 is displaced sufficiently to precisely axially align the electrode rotating and supporting means 55 and the replacement electrode 56 carried thereby with the chosen one of the working electrodes 11.

In operation, the furnace 10 is provided with a plurality of working electrodes, e.g., three electrodes 11 arranged in a triangular pattern in the illustrated embodiment. These electrodes are each connected to a source of electrical current through the holding and adjusting mechanisms 12 which are individual to the electrodes, and the electrodes are progressively consumed at individual consumption rates dependent upon the furnace operating conditions.

Figure 3:
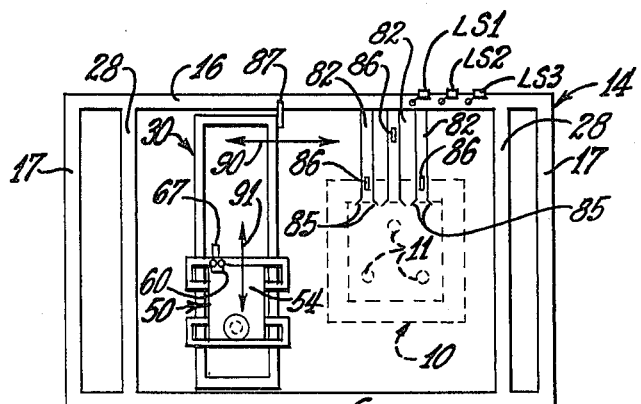
FIG. 3 is a schematic plan view similar to FIG. 2 and better illustrating the guiding and locating mechanism of the apparatus.

When a replacement electrode is required, the replacement electrode 56 is engaged by the electrode supporting and rotating means 55 from a supply source (not shown) preferably located generally beneath the support structure 14 at the left side thereof as illustrated in FIGS. 1 and 2. The motor 19 is then actuated to move the trolley frame 30 longitudinally along the parallel support rails 16 in the direction indicated by the arrow 90 of FIG. 3. Assuming that the electrode 11 located at the right extremity of the electrode pattern shown requires replenishment, the frame 30 moves along the rails 16 until the limit switch LS-3 is actuated by the abutment 87 carried by the trolley frame, as best shown in FIG. 3. The limit switches LS-1, LS-2 and LS-3 have been deleted from FIGS. 1 and 2 for clarity, but their relative positions are shown in FIG. 3. It will be noted that an individual limit switch is provided for each electrode.

When the switch LS-3 is actuated, for example, the motor 19 is de-activated, and the frame 30 is halted in general transverse alignment with the desired furnace electrode, i.e., the replacement electrode 56 is in general transverse alignment with the furtherest right working electrode 11. Next, the trolley motor 40 is actuated to move the trolley 50 transversely toward the desired working electrode in the direction of the arrow 91 of FIG. 3. As the trolley advances, the rollers 70 on the mast 60 are centered by the deflector plates 85 of the guide element 82 for the specific electrode. The guide plates 85 defelct the rollers to pass therebetween, so that the rollers engage the opposite vertical guide surfaces 83 of the guide elements 82. Any necessary shifting of the trolley longitudinally of the guide rails 16 is accommodated by the slack in the chains 27, and the mast 60 is sufficiently rigid to cause such shifting movement of the trolley as may be necessary to insure passage of the rollers between the deflector plates.

The trolley continues to move transversely, such movement being guided by the guide surfaces 83, until the contact pad 67 of the shock absorber 66 contacts the fixed stop 86 carried by the guide surfaces 83. The abutment of the pad 67 with the stop 86 halts any further transverse movement of the trolley and precisely positions the replacement electrode in axial alignment with the working electrode, since the longitudinal position of the trolley on the guide rails 16 is determined by the roller-guide surface contact and the transverse position of the trolley on the trolley frame rails 33 is determined by the pad-stop contact.

After the replacement electrode installation is complete and the replacement electrode is released from the supporting means 55, the transverse movement of the trolley is reversed to remove the abutment pad 66 from the stop 86, the trolley frame 30 then is retracted longitudinally along the guide rails 16, and the mechanism is ready for the next operation.

We claim:

1. A trolley mechanism for aligning a replacement electrode with a vertical working electrode for threaded end-to-end engagement therewith, the working electrode being installed in an electric arc melter, comprising a pair of fixed, parallel, spaced guide rails generally overlying the furnace and laterally spanning the electrode location; a trolley frame spanning the guide rails and guided thereby for movement; means for moving said trolley frame longitudinally along said guide rails into substantial transverse alignment with the working electrode location; a trolley carried by said trolley frame for movement relative to the frame, electrode carrying means on said trolley, means for moving said trolley relative to said trolley frame transversely toward the electrode location, a vertical mast mounted on said trolley for movement therewith; interengaging means on said mast and said guide rails to position said trolley in precise alignment with said working electrode; and a fixed stop located on said guide rail and engageable by said mast to precisely position said trolley with said electrode carrying means in vertical alignment with said working electrode.

2. An electrode positioning mechanism for an electric arc melter, said mechanism including a trolley overlying said furnace and carrying an engaging means for a replacement electrode depending from the trolley, means for accurately positioning the trolley so that the replacement electrode is precisely aligned with a working electrode for threaded engagement therewith and comprising means supporting said trolley for rectilinear movement in two directions relative to the electrode, a fixed vertical guide surface precisely aligned with said electrode position, guide means on the trolley engageable with said guide surface, means for moving said trolley in one direction to generally align the trolley guide means with said guide surface, means for moving said trolley in the other of said two directions to move the trolley guide means along said guide surface, and a fixed stop on said guide surface and interposed in the path of movement of said trolley guide means to halt the trolley with the replacement electrode in precise alignment with the working electrode.

3. An apparatus for positioning a replacement electrode in precise vertical alignment with a working electrode, comprising a trolley, means on the trolley for suspending a replacement electrode therefrom, means for displacing the trolley rectilinearly in a first longitudinal direction and in a second transverse direction, means halting movement of the trolley in the first direction when the replacement electrode is generally transversely aligned with the working electrode, fixed guide means interposed in the path of transverse trolley movement and engageable with the trolley to position the replacement electrode in precise longitudinal alignment with the working electrode, and a fixed stop located on said transverse guide means and engageable by the trolley to halt transverse trolley movement when the replacement electrode is in precise axial alignment with the working electrode.

4. A method of positioning a replacement electrode in precise vertical alignment with a working electrode, the replacement electrode being suspended from an overhead trolley, comprising the steps of linearly moving the trolley longitudinally into general transverse alignment with the electrode location, and linearly moving the trolley transversely toward the electrode location while (1) contacting the trolley with a fixed transverse guide to shift the trolley longitudinally and to bring the replacement electrode into precise transverse alignment with the working electrode, and (2) contacting the trolley with a fixed stop to halt the transverse trolley movement when the replacement electrode is precisely aligned with the working electrode.

5. An apparatus for positioning a replacement electrode in precise vertical alignment with a selected one of a plurality of longitudinally and transversely spaced working electrodes, comprising a trolley; means on the trolley for suspending a replacement electrode therefrom; means for displacing the trolley rectilinearly in a first longitudinal direction and a second transverse direction; means halting movement of the trolley in the first longitudinal direction when the replacement electrode is generally transversely aligned with the selected working electrode; a plurality of longitudinally spaced, transversely extending, fixed guide rails, one such rail being precisely aligned with each of said working electrodes, and each such guide rail being engageable with the trolley to position the replacement electrode in precise longitudinal alignment with the corresponding working electrode; and a fixed stop located on each of said guide rails and engageable by the trolley to halt transverse trolley movement when the replacement electrode is in precise axial alignment with the corresponding working electrode.

6. A trolley mechanism for aligning a replacement electrode with a vertical working electrode for threaded end-to-end engagement therewith, the working electrode being installed in an electric arc melter, comprising a pair of fixed, parallel, spaced guide rails generally overlying the furnace and laterally spanning the electrode location; a trolley frame spanning the guide rails and guided thereby for movement; means including a drive chain connected to the trolley frame for moving said trolley frame longitudinally along said guide rails into substantial transverse alignment with the working electrode location; a trolley carried by said trolley frame for movement relative to the frame; electrode carrying means on said trolley; means for moving said trolley relative to said trolley frame transversely toward the electrode location, a vertical mast mounted on said trolley for movement therewith; interengaging means on said mast and said guide rails to shift said trolley longitudinally of said guide rails into precise alignment with said working electrode, the slack in said drive chain accommodating such shifting of the trolley frame; and a fixed stop located on said guide rail and engageable by said mast to precisely position said trolley with said electrode carrying means in vertical alignment with said working electrode.

7. In an electrode positioning mechanism for an electric arc melter having a plurality of vertical working electrodes, said mechanism including a trolley overlying said furnace and carrying an engaging means for a replacement electrode depending from the trolley, the improvement comprising means supporting said trolley for rectilinear movement in two directions relative to the electrodes, a fixed vertical guide surface precisely aligned with each electrode position, means on the trolley selectively engageable with one of said guide surfaces, means for moving said trolley in one direction to generally align the trolley with the selected guide surface, means for moving said trolley in the other of said two directions to move the trolley along said guide surface, and a fixed stop located on said guide surface to halt the trolley with the replacement electrode in precise alignment with the working electrode.

8. In a method of positioning a replacement electrode in precise vertical alignment with a working electrode, the steps of suspending a replacement electrode from an overhead support, linearly moving the replacement electrode into general transverse alignment with the working electrode location, and linearly moving the replacement electrode transversely toward the working electrode location while (1) contacting the overhead support with a fixed transverse guide to shift the replacement electrode longitudinally into precise transverse alignment with the working electrode, and (2) contacting the overhead support with a fixed stop to halt the transverse replacement electrode movement when the replacement electrode is precisely aligned with the working electrode.

9. An apparatus for positioning a replacement electrode in vertical alignment with a working electrode in an arc-type furnace, comprising a pair of parallel rails overlying the working electrode, a movable bridge spanning said rails, means for displacing the bridge along said rails to a predetermined position generally vertically aligned with the electrode position, a trolley carried by said bridge and movable relative thereto in a direction generally perpendicular to the displacement direction of said bridge, means for moving said trolley relative to the bridge to align the trolley with the electrode position, guide means fixed relative to the electrode position and interposed in the path of movement of said trolley, means on said trolley engageable with said fixed guide means to accurately position said trolley at said electrode position, and means accommodating shifting of said bridge on said rails in response to engagement of said trolley with said guide means.

* * * * *